Nov. 26, 1935.   A. J. E. MUNTERS   2,022,570
ICE SAFE
Filed July 29, 1929   2 Sheets-Sheet 1

A. J. E. Munters
INVENTOR

By: Marks & Clerk
Attys.

Nov. 26, 1935.  A. J. E. MUNTERS  2,022,570
ICE SAFE
Filed July 29, 1929   2 Sheets-Sheet 2
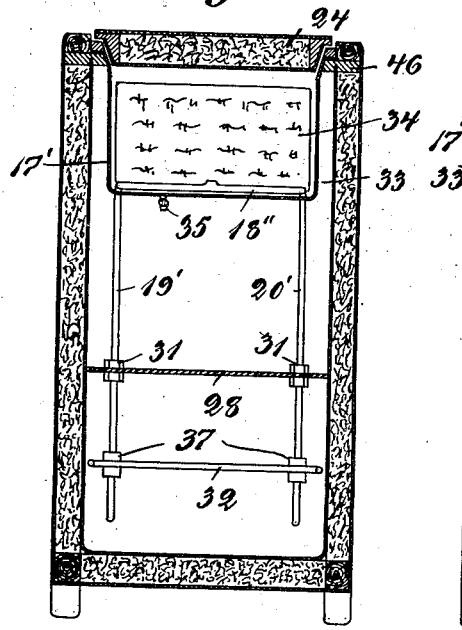
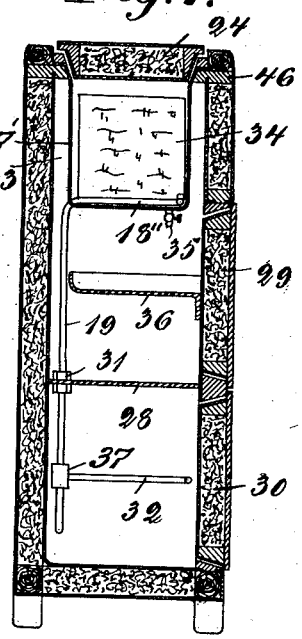

Patented Nov. 26, 1935

2,022,570

UNITED STATES PATENT OFFICE 2,022,570

ICE SAFE

Anders Johan Ericsson Munters, Stockholm, Sweden

Application July 29, 1929, Serial No. 382,002
In Sweden April 23, 1928

5 Claims. (Cl. 62—46)

It is previously known in refrigerating plants to mediate the transfer of heat by means of a circulating condensable agent enclosed in a circulating system which is arranged in heat conducting communication both with the refrigerator and with the store chamber or the like to be cooled. On account of the difference in temperatures in the refrigerator and the air or the liquid in the chamber to be cooled said agent is brought to circulate while being alternately condensed and again evaporated at a constant pressure. The present invention has for its object the application of such an arrangement in ice safes or chests. According to a preferred embodiment of the invention a circulating system of said kind is combined with a container for the cooling agent or substance preferably disposed in the upper part of the chest in such a manner that the heat transfer from the interior of the chest to the cooling agent takes place partially through the walls of said container, which is arranged in direct contact with the air in the chest and partially through the intermedium of said circulating system. By using such a combined refrigerating system better economy in the consumption of refrigerant together with a more efficient refrigeration and a more uniform temperature is attained than in ice chests of the ordinary kind. Furthermore, the useful space inside the chest may be increased on account of the reduction of the volume of the cooling agent container which is thereby made possible.

Figure 1:
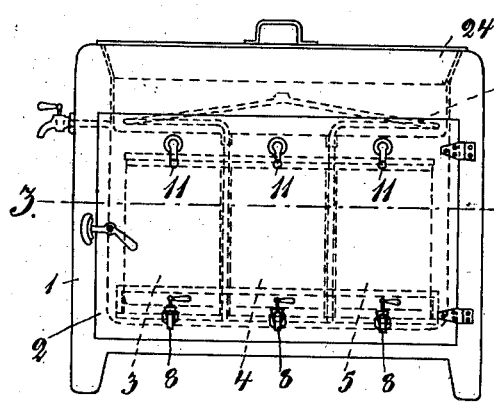
Figure 2:
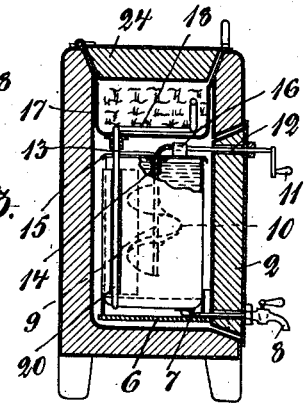
Figure 3:
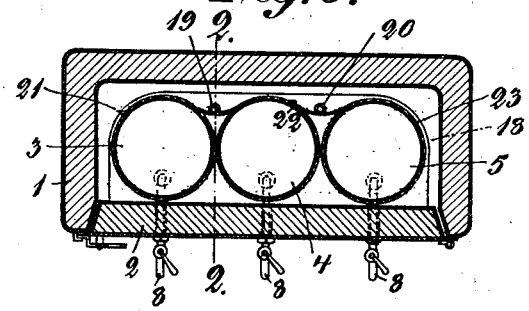
Figure 4:
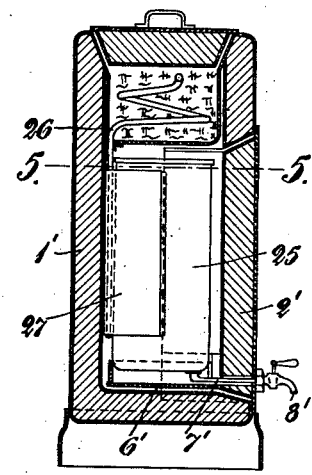

The invention will be more closely described with reference to the accompanying drawings. Figure 1 shows an ice chest according to the invention in front view. Figure 2 shows a vertical section on the line 2—2 in Figure 3 and Figure 3 shows a horizontal section on the line 3—3 in Figure 1. Figure 4 is a vertical section and Figure 5 a horizontal section of another embodiment. Figures 6 and 7 are two vertical sections of a third embodiment.

The ice chest 1 shown in Figures 1 to 3 is, as usual, provided with a door 2 swingable on hinges and made of heat insulating material. On the inside of the door three storing vessels 3, 4, 5 are mounted. They are disposed on a shelf 6 secured to the door and provided with outlet pipes 7 connected to the bottom, which pipes extend through holes in the door and, on the outside of the door, are provided with outlet cocks 8 which at the same time serve as fixing members to retain the vessels in correct positions said cocks, when threaded onto the pipes 7, being tightened against the outside of the door. In the example shown, said vessels are intended for the storing and distribution of milk or cream, and for this purpose, they are provided with a stirring device comprising a helical plate 10 disposed on a vertical shaft 9 and adapted to be rotated by means of a crank 11 disposed outside the door. The shaft 12 of said crank then extends through the door and is connected to a vertical shaft 9 by means of an elastic portion 13. The shaft 9 is journalled in a central bushing 14 in a support 15 disposed on the upper edge of the vessel which support carries a bearing 16 for the crank shaft 12.

The refrigerating system of the chest comprises a refrigerator or ice container 17 disposed in the upper part of the chest and the bottom of which forms the ceiling in the store chamber, and also a closed circulating system consisting of a pipe 18, 19, 20, the upper part 18 of which is located inside the chamber 17 whereas its both ends 19, 20 extend through the bottom of the container 17 and further vertically downwards through the store chamber at some distance from the rear wall of the chest in such a manner that it is surrounded on all sides by the air circulating in the chest. The vertical parts 19, 20 are preferably disposed in such a manner that they are positioned in the interspaces between the vessels 3, 4 and 4, 5 respectively, when the door 2 is closed. The pipe 18, 19, 20 is sealed in both ends and contains a volatile liquid, which is condensable at the low temperature prevailing in the container 17 and which evaporates at the higher temperature prevailing in the interior of the ice chest. A substance which can be used for said purpose is, by way of example, ammonia. It is introduced at a suitable pressure so as to fill only partially the pipe when the ammonia is in a liquid state. When ice is placed in the container 17 the ammonia is condensed in the upper part 18 of the pipe coil while delivering heat to the ice. The condensed ammonia runs down into the end portions 19, 20 where it is again evaporated while absorbing heat from the air in the storing chamber. In order to facilitate further the heat conduction plates 21, 22, 23 are provided on the vertical end portions 19, 20 of the pipe which plates partially enclose the vessels and are elastic in such a manner that the vessels, upon the door being closed, are brought in an immediate metallic contact with the plates. In the container 17 ice or other refrigerant may be introduced through a lid 24.

By the described arrangement an efficient heat conduction is obtained both directly through the bottom of the container 17 and through the pipe 18, 19, 20, which latter rapidly transfers heat from the lower parts of the storing chamber or from the vessels placed in the storing chamber respectively. The described construction permits also a better economy of the refrigerant or the energy required for the generation of cold respectively, as the liquid in the vessels 3, 4, 5 may be tapped off without opening the door 2 for said purpose. When the vessels have to be refilled this may take place quickly and easily by opening the door 2 the vessels then being immediately accessible for filling purposes there being no need to take them out of position.

Figure 5:
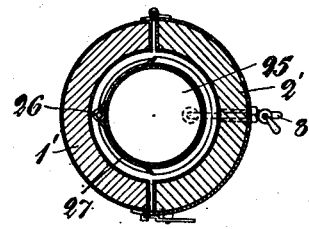

Figures 4 and 5 show an embodiment intended for a single larger vessel 25 such as a milk can. The chest 1' is in this case preferably designed as a cylinder the door 2' forming a semi-cylinder. Otherwise the arrangement is substantially the same as that in Figures 1 to 3 and includes the shelf 6', a single outlet pipe 7' having a cock 8' connected therewith. The single end 26 of the pipe 18 extends downwards behind the vessel and is provided with a plate 27 halfway enclosing the vessel and forming a heat conducting contact surface.

Figures 6 and 7 show an ice chest especially intended to be used in smaller households. The interior of the chest is divided into two store chambers disposed vertically above each other said chambers being separated from each other by means of a partition 28. Such an arrangement is generally preferred in case it is desirable to store articles of different kinds in different chambers no air circulation being then allowed between the two chambers. Both chambers are for this reason provided with separate doors 29, 30. To obtain a sufficiently low temperature in the lowermost chamber the two end portions 19', 20' of the cooling pipe extend down to said chamber. Said end portions are disposed at some distance from the rear wall of the chest and extend through holes in the partition 28 and are detachably secured to the latter by means of nuts 31 threaded on to the tubes which nuts at the same time serve to tighten said holes so as to prevent air from penetrating through the holes from the one chamber to the other. In this manner also a metallic connection between the pipe coil and the metallic partition 28 is established the heat transfer being thus facilitated. The shelves disposed in the store chambers may also be disposed for the same purpose in direct metallic connection with the end portions 19', 20' of the pipe. Such an arrangement is shown in the lower storing space where a shelf 32 is directly mounted on the two end portions 19', 20' preferably in such a manner that it may be displaced on the end portions and thus be adjusted to the desired height and retained in adjusted positions by set screws 37. The heat transfer from the lower store chamber will thus take place substantially through the pipe 18', 19', 20' and the partition 28 and the shelf 32. The cooling of the upper store chamber takes place both through the pipe 18', 19', 20' and also immediately through the walls of the container 17'. The latter is disposed in such a manner that an air space 33 is formed between the sides of the container 17' and the walls of the chest both the bottom and the sides of the container 17' being then useful as a cooling surface. The disposition of the pipe coil renders possible a reduction of the efficient cooling surface of the container 17' and thus a reduction of the volume of the cotainer which in turn results in a gain of a corresponding useful space beneath the container. A cooling system of this kind will thus encroach in a less degree upon the useful space in the chest than is the case in ordinary ice chests under otherwise similar conditions. In practice the shape and volume of the container 17' is preferably adapted to suit the shape and the volume of the ice pieces 34, which are sold on the market.

The circulating system may also be arranged in contact with the inner sheet metal coating of the chest to increase the heat absorbing surface or it may, if desired, be designed in the shape of a channel system disposed in metallic parts of the chest walls. The shown arrangement in which the pipe is surrounded on all sides by the circulating air should be more economical and, furthermore, is more advantageous from a constructional point of view and also from the point of view of assembling. The ice chamber and the pipe coil thus form a constructional unit which easily may be mounted in position in the chest and which may be removed or replaced without difficulty. The container 17' should then be provided with a cock 35 for drawing off the ice water arranged in such a manner so as not to prevent the removing of the ice container from the chest.

In the upper storing chamber a shelf 36 is disposed at a suitable height above the partition 28 which shelf is mounted on the door 29 in such a manner that it may be swung out by opening the door. In this manner the food stuffs 35 disposed on the shelf 36 and the partition 28 become more easily accessible. Evidently a plurality of such swingable shelves may be disposed alternately with fixed shelves.

In ice chests having two or several store chambers which are separated from each other so as to prevent any air circulation between said spaces it is necessary to provide the different store chambers with separate doors as shown by way of example in Figure 7.

I claim:—

1. In an ice-safe the combination of an ice container disposed in the upper part of the storage chamber, a closed fluid heat exchange element containing a condensable agent and having a substantially horizontal portion located inside the ice-container and substantially vertical portions extending outside the ice container through the storage chamber, and shelves in the storage chamber supported by and disposed in heat conducting communication with said vertical portions of the circulating system.

2. In an ice-safe the combination of an ice container disposed in the upper part of the storage chamber, a closed fluid exchange element containing a condensable agent and consisting of a pipe having a substantially horizontal portion located inside the ice-container and substantially vertical portions extending outside the ice container through the storage chamber, and shelves in the storage chamber supported by and adjustable along said vertical portions of the circulating system.

3. In an ice-safe, the combination of an ice container and a fluid heat exchange element, both arranged in the storage chamber of the safe in heat conducting communication with one another and with the air in the storage chamber, said fluid heat exchange element being closed up in itself and against the ice container, and a condensable agent contained in said element adapted to circulate due to the difference in temperatures of the ice container and of the air in the storage chamber, while being alternately condensed and evaporated.

4. In an ice-safe the combination of an ice container and a fluid heat exchange element both arranged inside the safe in heat conducting communication with one another, said fluid heat exchange element being closed up in itself and against the ice container and consisting of a pipe system containing a condensable agent and comprising a substantially horizontal portion located inside the ice container across the bottom thereof, and in which the circulating agent is condensed, and having substantially vertical portions extending outside the ice container and in which the circulating agent is evaporated.

5. In an ice-safe the combination of an ice container and a fluid heat exchange element both arranged inside the safe in heat conducting communication with one another, said fluid heat exchange element containing a condensable agent and consisting of a pipe closed at both ends, and comprising a substantially horizontal portion located inside the ice container across the bottom thereof and in which the circulating agent is condensed, and substantially vertical portions extending outside the ice container and in which the condensate and the vapors of the circulating agent are flowing in opposite directions.

ANDERS JOHAN ERICSSON MUNTERS.